United States Patent
Brachmann

(10) Patent No.: US 6,788,509 B2
(45) Date of Patent: Sep. 7, 2004

(54) APPARATUS FOR PROTECTION OF ELECTRONIC CIRCUITS

(75) Inventor: Markus Brachmann, Nuremberg (DE)

(73) Assignee: Lucent Technologies Inc., Murray Hill, NJ (US)

(*) Notice: Subject to any disclaimer, the term of this patent is extended or adjusted under 35 U.S.C. 154(b) by 48 days.

(21) Appl. No.: 10/117,602

(22) Filed: Apr. 5, 2002

(65) Prior Publication Data

US 2003/0189805 A1 Oct. 9, 2003

(51) Int. Cl.[7] .............................. H02H 3/38; H02J 3/00
(52) U.S. Cl. ............................ 361/90; 361/90; 307/11
(58) Field of Search ..................... 361/90, 93.1, 100; 307/11, 12, 18, 19, 30, 38

(56) References Cited

U.S. PATENT DOCUMENTS

| | | | | |
|---|---|---|---|---|
| 4,924,170 A | * | 5/1990 | Henze | .......................... 323/272 |
| 5,828,140 A | * | 10/1998 | Shih | .............................. 307/18 |
| 6,084,383 A | * | 7/2000 | Borinsky et al. | ........... 323/268 |
| 6,121,693 A | * | 9/2000 | Rock | ............................ 307/18 |
| 6,333,650 B1 | * | 12/2001 | Amin et al. | ................. 327/143 |
| 6,424,513 B1 | * | 7/2002 | Wissell et al. | ............. 361/93.1 |

* cited by examiner

Primary Examiner—Stephen W. Jackson
Assistant Examiner—Danny Nguyen

(57) ABSTRACT

The invention relates to an apparatus (1) for protection of electronic circuits with a decentralized power supply (PS1, PS2). One object of the invention is to avoid damage to other loads (PN1, PN2) which are still intact when a short circuit occurs in one load (PN1, PN2) in the circuit. The apparatus (1) comprises a number of loads (PN1, PN2) which are supplied in a decentralized manner. One monitoring device (PSUP1, PSUP2) in each case monitors a respective one of the load supply voltages (P1, P2) and ensures primary-side fault disconnection of all the power supplies (PS1, PS2) if a threshold value is undershot.

16 Claims, 2 Drawing Sheets

APPARATUS FOR PROTECTION OF ELECTRONIC CIRCUITS

BACKGROUND OF THE INVENTION

I. Field of the Invention

The invention relates to an apparatus for protection of electronic circuits in general, and to an apparatus such as this having a decentralized power supply, in particular.

II. Description of the Related Art

In the course of the continuously increasing miniaturization and integration of electronic circuits, different functional units are typically accommodated on a board. In this case, different functional units are frequently operated from different power supplies on the board, or in a decentralized manner. This is particularly necessary when functional units or components with different operating voltages, for example 2.5, 3.3 or 5 volts are used on the same board.

Despite having a decentralized power supply, the functional unit [sic] are at least functionally networked. This leads to the problem that, if the supply to one functional unit fails, in particular in the event of a voltage failure, for example due to a short to earth, circuits in other functional units which are connected to the components of the functional unit of the failed supply network can likewise become involved.

If, for example, an output driver which is located within a functioning functional unit drives an input driver which is located in the functional unit of a failed supply network, then the output driver may possibly itself be short-circuited via the input diode of the input driver. As a result, the output driver may become involved because of the power loss caused by the short circuit current, and in the worst case it may even be completely destroyed.

This can in turn lead to damage to circuits in further functional units, as a chain reaction.

SUMMARY OF THE INVENTION

One object of the present invention is thus to provide an apparatus which protects electronic assemblies, in particular in the case of decentralized power supplies, against overloading.

A further object of the invention is to prevent, or at least to reduce, damage to further components in a functional unit or in another functional unit when damage occurs to components in this functional unit.

The object of the invention is achieved in a surprisingly simple manner just by the subject matter of Claim 1.

The apparatus according to the invention protects, in particular, electronic circuits and comprises a first and a second power supply as well as a first and second load, which are associated with the first and the second power supply, respectively. A monitoring circuit monitors the function of the first and/or the second load and/or the first and/or the second power supply. If, for example, a malfunction occurs, in particular a voltage failure, the first and/or the second power supply can be controlled and/or switched off by means of the monitoring circuit.

The power supply to all the loads can thus advantageously be switched off when a malfunction, for example a short circuit, occurs in one of the loads. Control or disconnection may, however, also be carried out in the event of failure of one of the power supplies. This advantageously avoids, or at least reduces, damage to components which are still intact, including damage to components in loads other than that which is faulty.

The output voltage from the first and/or from the second power supply is preferably monitored in order to detect any voltage drop below a first or, respectively, second predefined voltage threshold.

The control or disconnection of the power supplies is preferably carried out on their primary side.

In one preferred development, the monitoring circuit is supplied in a redundant manner from the first and the second power supply. This has the advantage that the monitoring circuit is still supplied with power for as long as at least one of the power supplies is functional.

The monitoring circuit preferably comprises a first and a second monitoring device, which are respectively associated with the first and the second power supply, and monitor them respectively. The output voltage from each individual power supply is thus advantageously monitored.

The disconnection preferably takes place within a short time after detection of the malfunction by at least one of the monitoring devices, preferably more quickly than a time which is matched to the application, for example more quickly than 300 ms, particularly preferably more quickly than 30 ms, and particularly preferably more quickly than 3 ms.

The first and the second monitoring device preferably transmit a respective first and a second control signal, which assumes a fault state in the event of the output voltage from the first or second power supply, respectively, falling below the first or second predefined voltage threshold respectively. The first and the second voltage threshold can be preselected independently of one another by means of the first and second monitoring device, respectively. The first and the second control signal of the first and of the second monitoring device, respectively, are subjected to a logic-OR process, so that the logic device emits at its output a third control signal, which defines a fault state while at least one of the two monitoring devices detects a voltage drop, for example a corresponding voltage threshold being undershot.

The first and the second power supply are preferably supplied from the same voltage source, preferably a DC voltage source, for example a battery, and/or by means of a supply rack.

A first switch of the voltage source is preferably associated with the first and the second power supply, so that the first and the second power supply can be switched on and off, preferably simultaneously, by the first switch.

One preferred development comprises a second switch, which receives the third control signal from the logic device and, when this control signal assumes the fault state, disconnects all the power supplies, that is to say carries out a fault disconnection.

The second switch preferably comprises conductive decoupling, for example an optocoupler, comprising a light-emitting transmitting diode and a photosensitive thyristor, so that an input and output of the second switch are electrically or conductively decoupled.

A first resistor is preferably connected in series with the thyristor, to ensure that a sufficient holding current holds the thyristor active, even when the light-emitting transmitting diode is likewise switched off as a result of the fault disconnection.

One preferred development comprises a third monitoring device which is supplied in a redundant manner from the first and the second power supply and transmits a fourth control signal or veto signal to the logic device. When the apparatus is started up or switched on, the third monitoring device ensures that the logic device does not produce a fault signal even though the output voltages from the power supplies have not yet reached the nominal value or operating value. The veto signal from the third monitoring device assumes a veto state for at least as long as the nominal voltages of the first and of the second power supply have not been reached, or have not yet been reached. The veto signal is preferably switched from the veto state to a non-veto state with the delay, thus ensuring that, when the apparatus is being started, the veto state lasts for longer than the fault state of the first or of the second control signal from the first and the second monitoring devices, respectively. This prevents undesirable fault disconnection, and an oscillation state.

One preferred development of the invention comprises further power supplies, loads and monitoring devices, with one load in each case being associated with one power supply and one monitoring device in each case being associated with one load. In particular, 3, 4, 5, 6 or more of these functional units or supply units are provided in each case.

In this case, where there are a number, preferably the same number, of power supplies, loads and monitoring devices, the monitoring devices are supplied in a redundant manner from essentially all the power supplies, and the control signals from essentially all the monitoring devices are subjected to a logic OR operation. This advantageously results in disconnection of all the power supplies if the output voltage of at least one of the power supplies falls below the predetermined threshold value and the protection mechanism according to the invention is functional, provided that at least one of the power supplies is still operating.

The invention will be explained in more detail in the following text using preferred embodiments and with reference to the drawings, with identical or similar components being provided with the same reference symbols.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

Figure 1:
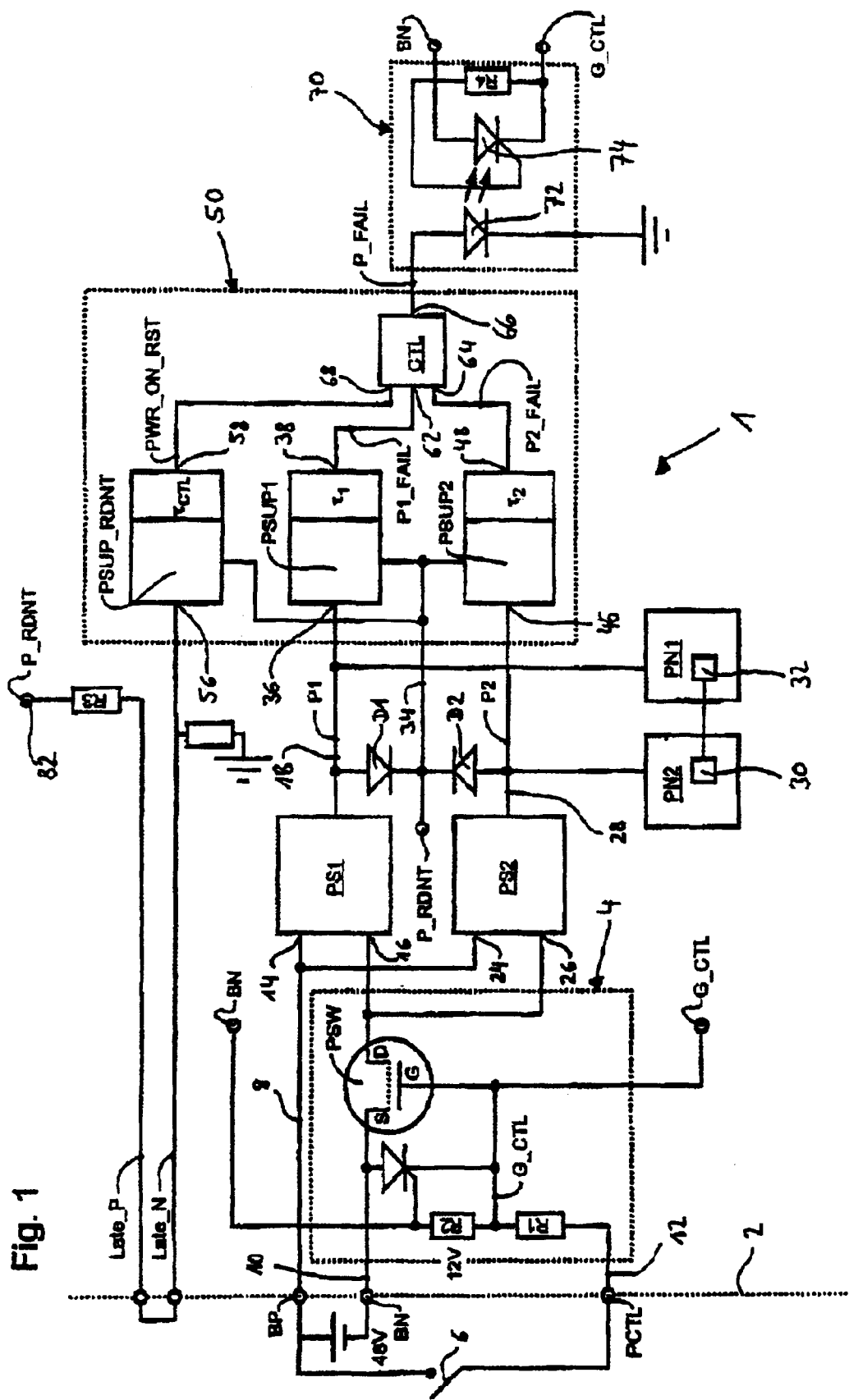
FIG. 1 shows a block diagram of a first embodiment of the invention.

FIG. 1 shows a first embodiment of the apparatus according to the invention, or an electronic circuit 1 on a circuit mount, for example a board. The circuit mount is inserted into a supply rack (not shown), with the dotted line 2 schematically representing the interface between the circuit mount and the supply rack. A voltage source in the form of a battery is located in the supply rack, and provides a supply voltage U of, for example, 48 volts, which is produced between the positive pole BP and the negative pole BN.

A first and a second supply voltage PS1, PS2 are fed from the supply voltage U. In this case, the two power supplies PS1, PS2 are connected directly to the positive pole BP of the voltage source via a supply line 8 while, in contrast, a negative supply line 10 connects the power supplies PS1, PS2 to the negative pole BN via a switched-mode regulator 4, that can be switched. The switched-mode regulator 4 comprises a resistor chain with resistors R1 and R2, which divide the supply voltage U=48 volts from the voltage source down so that a sufficiently high voltage, which switches the transistor to the switched-on region, for example 12 volts, is dropped across the resistor R2 when the main switch 6 is closed. The switched-mode regulator 4 furthermore has a switching transistor, for example in the form of a field-effect transistor PSW, for switching the two power supplies PS1, PS2 on and off. For this purpose, the source S is connected directly to the negative pole of the voltage source, the drain D is connected to the negative inputs 16, 26 of the two power supplies PS1, PS2, and the gate G is connected to the voltage divider, between the resistors R1 and R2. The two power supplies PS1 and PS2 are switched on and off via the main switch 6, which connects a control line 12 to the positive pole P. Closing the main switch 6 thus results in a positive control signal PCTL on the control line 12, and the battery voltage U being divided down by the resistors R1 and R2 so that a control voltage G_CTL of, for example 12 volts is produced between the resistors R1 and R2, that is to say the magnitude of this voltage is sufficient to switch the transistor to the switched-on range. The control voltage G_CTL is applied to the gate G of the field-effect transistor PSW and switches it on, so that the supply voltage U is produced between the negative inputs 16 and 26 and the positive inputs 14 and 24 of the respective power supplies PS1 and PS2. It is obvious to a person skilled in the art that the switched-mode regulator 4 should be regarded as being only by way of example, and other switches can also be used.

A first load, for example, a first functional unit which in this exemplary embodiment is in the form of a first power network PN1, is supplied from the first power supply PS1 via a supply line 18. In an equivalent way, a second load, for example a second functional unit which in this exemplary embodiment is in the form of a second power network PN2, is supplied from the second power supply PS2 via a supply line 28.

The second functional unit or the second power network PN2 contains, for example, an output driver 30 which is connected to an input driver 32 in the first power network PN1, so that the first and second loads are connected.

A supply line 34 is supplied in a redundant manner from the two power supplies PS1 and PS2 with a signal P_RDNT via two diodes D1 and D2. The redundant signal or the voltage P_RDNT is supplied as a supply voltage to a first and a second monitoring device PSUP1 and PSUP2 via the supply line 34.

The first and the second monitoring device are components of a monitoring circuit 50 and monitor output signals P1 and P2 of the respective power supplies PS1 and PS2 on the respective supply lines 18 and 28. If the monitoring input 36 of the first monitoring device PSUP1 registers that the supply voltage P1 has fallen below a predefined first voltage threshold, it produces a fault signal P1_FAIL at a control output 38. In an equivalent manner to this, the second monitoring device PSUP2 produces a fault signal P2_FAIL at a control output 48 when its monitoring input 46 registers that the supply voltage P2 has fallen below a predefined second voltage threshold. In this case, the first and the second voltage threshold of the respective first and the second monitoring device PSUP1, PSUP2 may be matched independently to the same or different nominal voltages of the respective power supplies PS1 and PS2, so that the first and the second voltage threshold are the same or different. The control outputs 38, 48 of the first and of the second monitoring device PSUP1, PSUP2 are connected to inputs 62 and 64 of a monitoring logic device CTL. The fault signals P1_FAIL and P2_FAIL are subjected to an OR process in the monitoring logic device CTL, so that a fault signal P_FAIL is produced at an output 66 of the monitoring logic device CTL when at least one of the two monitoring devices PSUP1, PSUP2 detects a voltage undershoot and produces a fault signal.

The fault signal P_FAIL activates a light-emitting diode 72 of an optocoupler 70. This light triggers a controlled rectifier or thyristor 74, which thus produces a short circuit or an approximate short circuit between the poles BN and G_CTL. This short circuit leads to the field-effect transistor PSW in the switched-mode regulator 4 being switched off, that is to say it leads to a fault disconnection, in which the primary sides of both power supplies PS1 and PS2 are deactivated.

The resistor R1, which is connected in series with the thyristor, in the voltage divider has a resistance such that, once the thyristor 74 has been triggered by the light-emitting diode 72, it is held active by a holding current via the resistor R1, even if the light-emitting diode 72 is also deactivated by the fault disconnection. The thyristor 74 thus advantageously prevents the circuit from starting to oscillate.

If there is no need for conductive decoupling, or this is not desirable, it is possible, rather than using the optocoupler for disconnection, to carry out the disconnection using only the thyristor 74, which is then triggered directly by the fault signal P_FAIL.

In order to reactivate the circuit 1 after a fault disconnection, the switch 6 is opened for the purpose of main disconnection, so that the supply line 12 has a high impedance at one end. The holding current of the thyristor 74 thus collapses, and this thyristor is switched off. The switch 6 is opened, for example, under software control.

Alternatively, the board is removed from the supply rack, likewise resulting in the supply line 12 having a high impedance.

A third alternative for opening the switch 6 is to reduce the voltage of the voltage source below a predefined value, so that the thyristor current falls below the holding current level of the thyristor.

According to all three alternatives for main disconnection, the circuit 1 is prepared for restarting by closing the switch 6, connecting the board to the supply rack or raising the supply voltage U. This ensures that the power supplies can be reactivated only after an action, for example opening of the switch 6, once a fault disconnection has taken place, thus preventing the circuit 1 from starting to oscillate.

Furthermore, the predefined voltage thresholds of the first and of the second monitoring device PSUP1, PSUP2 are set to be significantly less than the nominal voltage of the power supplies PS1, PS2, thus preventing undesirable fault disconnection resulting from minor voltage fluctuations in the power supplies PS1, PS2. For example, the voltage thresholds are preselected to be between 10% and 90%, preferably between 25% and 75% and particularly preferably in the region of 50% below the respective nominal voltages of the power supplies PS1, PS2.

Furthermore, the circuit 1 has a third monitoring device PSUP_RDNT, which is supplied via the supply line 34 from the redundant power supply. Undershooting or overshooting of a third voltage threshold or of a threshold value of the redundant supply voltage P_RDNT is monitored at a monitoring input 56 of the third monitoring device PSUP_RDNT. As long as the redundant supply P_RDNT is below the predefined third threshold value of the third monitoring device PSUP_RDNT, a veto signal PWR_ON_RST is produced at an output 58, and is transmitted via an input 68 to the control logic device CTL. The veto signal prevents the fault signal P_FAIL from being emitted at the output 66 of the monitoring logic device CTL.

This effectively prevents a fault signal P_FAIL being produced when the circuit is being started up, for example as a result of the switch 6 being switched on, since the output voltages P1 and P2 of the respective power supplies PS1 and PS2 would not yet have reached their nominal value.

The redundant supply P_RDNT is passed from a point 82 via a resistor R3 and a line Late_P via the supply rack and a return line Late_N to the monitoring input 56 of the third monitoring device PSUP_RDNT. Contact pins (not illustrated) of the lines Late_P and Late_N at the interface 2 to the supply rack are shorter than the contacts of the positive and of the negative pole BP, BN, thus ensuring, when the board is plugged into the supply rack, that the voltage PSUP_RDNT to be monitored is applied to the monitoring input 56 of the third monitoring device later than the voltages P1, P2 that are to be monitored by the first and the second monitoring device PSUP1, PSUP2.

Alternatively or additionally, the third monitoring device PSUP_RDNT has a preferably internal delay element, which likewise delays the transition of the veto signal PWR_ON_RST from the veto state to a non-veto state by $\tau_{CTL}$. The first and the second monitoring device comprise a first and a second delay element, respectively, with the delays $\tau_1$ and $\tau_2$ which are preselected in this way being shorter than $\tau_{CTL}$.

Alternatively or additionally, the threshold value at the third monitoring device PSUP_RDNT is set to be higher than at the first and/or at the second monitoring device PSUP1, PSUP2.

This ensures that, when the circuit is being started up, the veto signal PWR_ON_RST is applied to the monitoring logic device for longer than the fault signals P1_FAIL and P2_FAIL, so that no fault signal P_FAIL is produced when the circuit is being started up, and no fault disconnection takes place.

The signal delay time from the switching on of the switch 6 to the deactivation of the veto signal PWR_ON_RST at the input 68 of the monitoring logic device CTL is preferably at least in the region of ten times longer than the signal delay time from the switching on of the main switching 6 to the application of the fault signals P1_FAIL and P2_FAIL to the respective inputs 62 and 64 of the monitoring logic device CTL, that is to say $\tau_{CTL} > 2*\max(\tau_1, \tau_2)$, $\tau_{CTL} > 5*\max(\tau_1, \tau_2)$ or $\tau_{CTL} > 10*\max(\tau_1, \tau_2)$.

Figure 2:
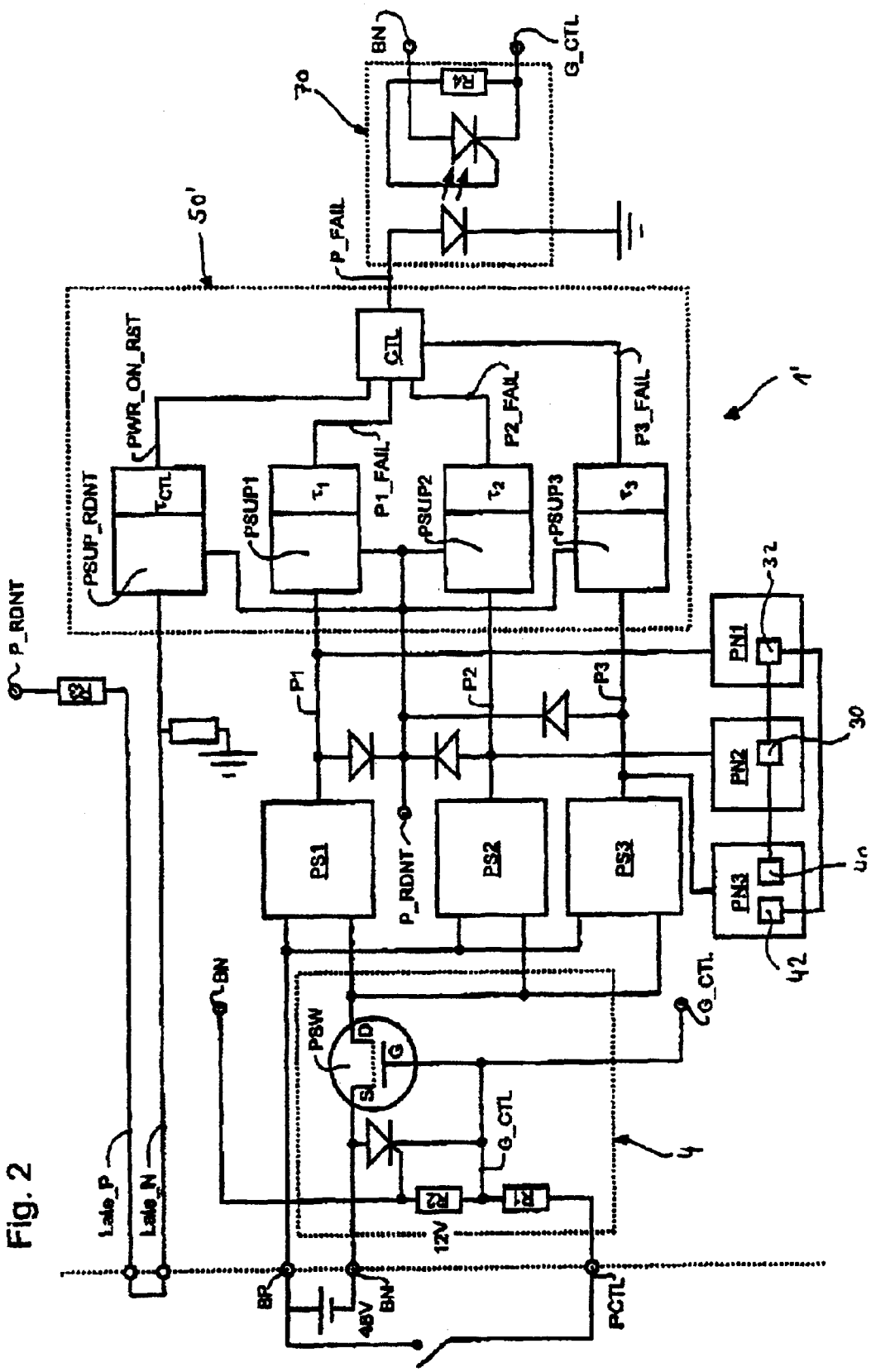
FIG. 2 shows a block diagram of a second embodiment of the invention.

FIG. 2 shows a second circuit 1', the majority of which is designed in an equivalent way to the circuit 1. In contrast to the circuit 1, the circuit 1' has an enlarged monitoring circuit 50' and three power supplies PS1, PS2, PS3 for supplying three power networks PN1, PN2, PN3. Each of the three power supplies PS1, PS2, PS3 is monitored by a respective monitoring device PSUP1, PSUP2 or PSUP3, with the three monitoring devices being supplied in a redundant manner from the three power supplies.

In particular, the third power network PN3 contains, for example, an output driver 42 which is connected to the input driver 32 of the first power network PN1. The third power network PN3 furthermore contains an input driver 40, which is connected to the output driver 30 of the second power network PN2, so that the three power networks PN1, PN2 and PN3 are connected to one another. In this case, in particular, each power network is connected to each of the others. The invention can be extended in an analogous manner to a large number of, that is to say more than three, power supplies, and more than three loads or power networks that are connected to one another.

The circuit according to the invention is used, in particular, in the field of telecommunications, for example for the Synchronous Digital Hierarchy (SDH).

It is evident to a person skilled in the art that the protection circuits 1 and 1' described by way of example here can be extended to any desired number of decentralized power supplies, for example to 4, 5, 6 or more, without departing from the spirit of the invention. In all these cases, the invention ensures that all the power supplies are disconnected completely when at least the output voltage of one power supply falls below a predefined threshold value and at least one power supply is still operating correctly.

What is claimed is:

1. An apparatus for protection of electronic circuits comprising :
    a first and a second power supply;
    a first and a second load associated with the first and the second power supply;
    a monitoring circuit for monitoring at least one of the first load, the second load, the first power supply and the second power supply;
    a first switch, associated with at least one of the power supplies for switching on and off the at least one power supply, a second switch for primary side fault disconnection of the at least one power supply; and
    a second switch for primary-side fault disconnection of the at least one power supply,
        an optocoupler with at least an optical transmitter; and
        a first resistor coupled with a controllable diode, the first resistor having a resistance such that a holding current holds the controllable diode active if the optical transmitter is switched off.

2. The apparatus of claim 1, wherein an output voltage from the first and/or from the second power supply is monitored by the monitoring circuit.

3. The apparatus of claim 1, wherein the monitoring circuit is supplied from the first and/or from the second power supply.

4. The apparatus of claim 1, wherein the monitoring circuit is supplied in a redundant manner from the first and from the second power supply.

5. The apparatus of claim 1, wherein the monitoring circuit comprises a first and a second monitoring device, associated with the first and the second power supply, respectively.

6. The apparatus of claim 1, further comprising a logic device associated with the monitoring circuit and/or the monitoring circuit transmits control signals to the logic device.

7. The apparatus of claim 6, wherein the logic device associated with the first and the second monitoring device and/or the first and the second monitoring device transmit control signals to the logic device.

8. The apparatus of claim 1, wherein the first and/or the second power supply is associated with a voltage source.

9. The apparatus of claim 1, wherein the second switch is associated with the monitoring circuit and/or can be switched by means of a signal which is transmitted by the logic device.

10. The apparatus of claim 1, wherein the second switch comprises conductive decoupling.

11. The apparatus of claim 1, further comprising a third monitoring device associated with the logic device and/or transmits control signals to the logic device.

12. The apparatus of claim 11, wherein the third monitoring device is supplied in a redundant manner from the first and the second power supply.

13. The apparatus of claim 11, wherein the third monitoring device comprises supply means for a signal which can be transmitted to the logic device.

14. The apparatus of claim 11, wherein case during switching on, the third monitoring device is coupled to a signal to be monitored with a time delay with respect to the first and/or the second monitoring device.

15. The apparatus of claim 1, further comprising:
    a number of power supplies;
    a number of loads, each load being associated with a power supply; and
    a monitoring circuit for functional monitoring of the loads and/or of the power supplies, wherein case the power supplies can be controlled and/or can be switched off by means of the monitoring circuit.

16. The apparatus of claim 15, wherein the monitoring circuit is supplied in a redundant manner from essentially all the power supplies.

* * * * *